United States Patent [19]

Ikebe et al.

[11] Patent Number: 5,297,532
[45] Date of Patent: Mar. 29, 1994

[54] SUPERCHARGING PRESSURE CONTROL SYSTEM FOR SUPERCHARGED INTERNAL COMBUSTION ENGINES

[75] Inventors: Hidehito Ikebe; Takuya Sugino; Susumu Nakajima; Kenichiro Kinoshita; Nobu Takahashi, all of Wako, Japan

[73] Assignee: Honda Giken Kogyo Kabushiki Kaisha, Tokyo, Japan

[21] Appl. No.: 960,961

[22] Filed: Oct. 14, 1992

[30] Foreign Application Priority Data

Oct. 16, 1991 [JP] Japan .................................. 3-296342
Dec. 27, 1991 [JP] Japan .................................. 3-360628

[51] Int. Cl.⁵ .............................................. F02B 33/00
[52] U.S. Cl. ................................................ 123/564
[58] Field of Search ................ 60/600, 601, 602, 603; 123/564

[56] References Cited

FOREIGN PATENT DOCUMENTS

| 52637 | 3/1982 | Japan | 60/602 |
| 37227 | 2/1984 | Japan | 60/602 |
| 49321 | 3/1984 | Japan | 60/602 |
| 3421 | 1/1985 | Japan . | |
| 19910 | 2/1985 | Japan | 60/602 |
| 17141 | 1/1986 | Japan . | |

Primary Examiner—Michael Koczo
Attorney, Agent, or Firm—Lyon & Lyon

[57] ABSTRACT

A supercharged internal combustion engine includes an intake passage, a supercharger arranged in the intake passage, an exhaust passage, and a catalytic converter arranged in the exhaust passage. A supercharging pressure control system for the engine controls the opening of a supercharging pressure control valve for controlling supercharging pressure of intake air supplied to the engine by the supercharger. When the temperature of the catalytic converter falls outside a predetermined range, the opening of the control valve is controlled in a manner such that the temperature of the catalytic converter is brought into the predetermined range.

6 Claims, 15 Drawing Sheets

SUPERCHARGING PRESSURE CONTROL SYSTEM FOR SUPERCHARGED INTERNAL COMBUSTION ENGINES

BACKGROUND OF THE INVENTION

1. Field of the Invention

This invention relates to a supercharging pressure control system for supercharged internal combustion engines.

2. Prior Art

Conventionally, there has been proposed, e.g. by Japanese Provisional Utility Model Publication (Kokai) No. 61-17141, a supercharging pressure control system for a supercharged internal combustion engine which has a supercharger arranged in the intake system of the engine, the supercharger being connected to the crankshaft of the engine, a bypass passage bypassing the supercharger, and bypass passage control means for opening and closing the bypass passage depending on operating conditions of the engine. The supercharging control system comprises sensor means for detecting the temperature of the engine at one or more points, and bypass passage-closing means for driving the bypass passage control means such that the bypass passage is fully closed when the sensor means detects that the engine is low in temperature. According to this prior art, when the sensor means detects a low temperature cold condition of the engine at the start of the engine, the bypass passage is fully closed to effect supercharging to the maximum degree, whereby warming-up of the engine is accelerated.

However, in the prior art system, upon starting of the engine under a cold condition, the bypass passage is fully closed to effect supercharging to the maximum degree, which results in wasteful consumption of a large amount of fuel to increase the fuel consumption. Further, a catalytic converter arranged in the exhaust system exhibits a low purifying efficiency (reactivity) before the temperature of exhaust gases flowing thereinto reaches a predetermined value, involving a problem of emission of large amounts of unpurified exhaust gases, which is caused by supercharging carried out at the start of the engine under a cold condition, resulting in degraded exhaust emission characteristics.

On the other hand, when the engine continues to be in a high speed or high load operating condition for a long time, such as when the vehicle is running at a high speed or going up a slope, the temperature of the exhaust gases may rise to such a degree as causes deterioration of the catalytic converter arranged in the exhaust system.

To protect the catalytic converter from such a deterioration of the catalyst converter, an air-fuel ratio control system has been proposed, e.g. by Japanese Provisional Patent Publication (Kokai) No. 60-3421, in which the air-fuel ratio of an air-fuel mixture supplied to the engine is feedback-controlled to a stoichiometric ratio or the vicinity thereof, in response to the actual air-fuel ratio detected based on a signal from an $O_2$ sensor, the system being adapted to stop the feedback control and hold the air-fuel ratio at a value richer than the stoichiometric value in response to a signal supplied from an exhaust gas temperature sensor mounted in the catalytic converter when the sensor signal shows that the temperature of exhaust gases is higher than a predetermined value, to thereby lower the temperature of exhaust gases to protect the catalytic converter from being deteriorated.

However, in this prior art system, while the air-fuel ratio is held at an enriched value after the temperature of exhaust gases becomes higher than the predetermined value, ingredients of exhaust gases, such as CO, HC, and NOx, cannot be properly purified, resulting in degraded exhaust emission characteristics, as well as in wasteful consumption of fuel or increased fuel consumption.

SUMMARY OF THE INVENTION

It is a first object of the invention to provide a supercharging pressure control system for a supercharged internal combustion engine, which is capable of protecting a catalytic converter arranged in the exhaust system when the temperature of exhaust gases is high, without degrading exhaust gas emission characteristics and fuel consumption.

It is a second object of the invention to provide a supercharging pressure control system for a supercharged internal combustion engine, which is capable of quickly enhancing the purifying efficiency of the catalytic converter when the engine is idling at the start of the engine, without degrading fuel consumption, to thereby improve exhaust gas emission characteristics.

To attain the above objects, the present invention provides a supercharging pressure control system for a supercharged internal combustion engine including an intake passage, a supercharger arranged in the intake passage, an exhaust passage, and a catalytic converter arranged across the exhaust passage, the supercharging pressure control system comprising a supercharging pressure control valve for controlling supercharging pressure of intake air supplied to the engine, obtained by the supercharger, driving means for driving the supercharging pressure control valve, control means for controlling the driving means, and temperature-detecting means for detecting a temperature of the catalytic converter.

The supercharging pressure control system according to the invention is characterized in that the control means includes determining means for determining whether or not the temperature of the catalytic converter detected by the temperature-detecting means falls within a predetermined range, the control means controlling the driving means in a manner such that the temperature of the catalytic converter is brought into the predetermined range, when the temperature of the catalytic converter falls outside the predetermined range.

Preferably, particularly to attain the first object of the invention, the predetermined range has an upper limit value determined by the rotational speed of the engine.

More preferably, the upper limit value is set such that it decreases as the rotational speed of the engine increases.

Preferably, particularly to attain the second object of the invention, the predetermined range has a predetermined lower limit value.

More preferably, the control means includes detecting means for detecting operating conditions of the engine, the determining means determining whether or not the temperature of the catalytic converter is lower than the predetermined lower limit value when it is detected by the detecting means that the engine is idling.

Further preferably, the control means includes desired supercharging pressure-setting means for setting a desired supercharging pressure according to the temperature of the catalytic converter when the determining means has determined that the temperature of the catalytic converter is lower than the predetermined lower limit value, the control means controlling the driving means in a manner such that supercharging pressure becomes equal to the desired supercharging pressure.

The above and other objects, features, and advantages of the invention will become more apparent from the ensuing detailed description taken in conjunction with the accompanying drawings.

DETAILED DESCRIPTION

The invention will now be described in detail with reference to the drawings showing embodiments thereof.

Figure 1:
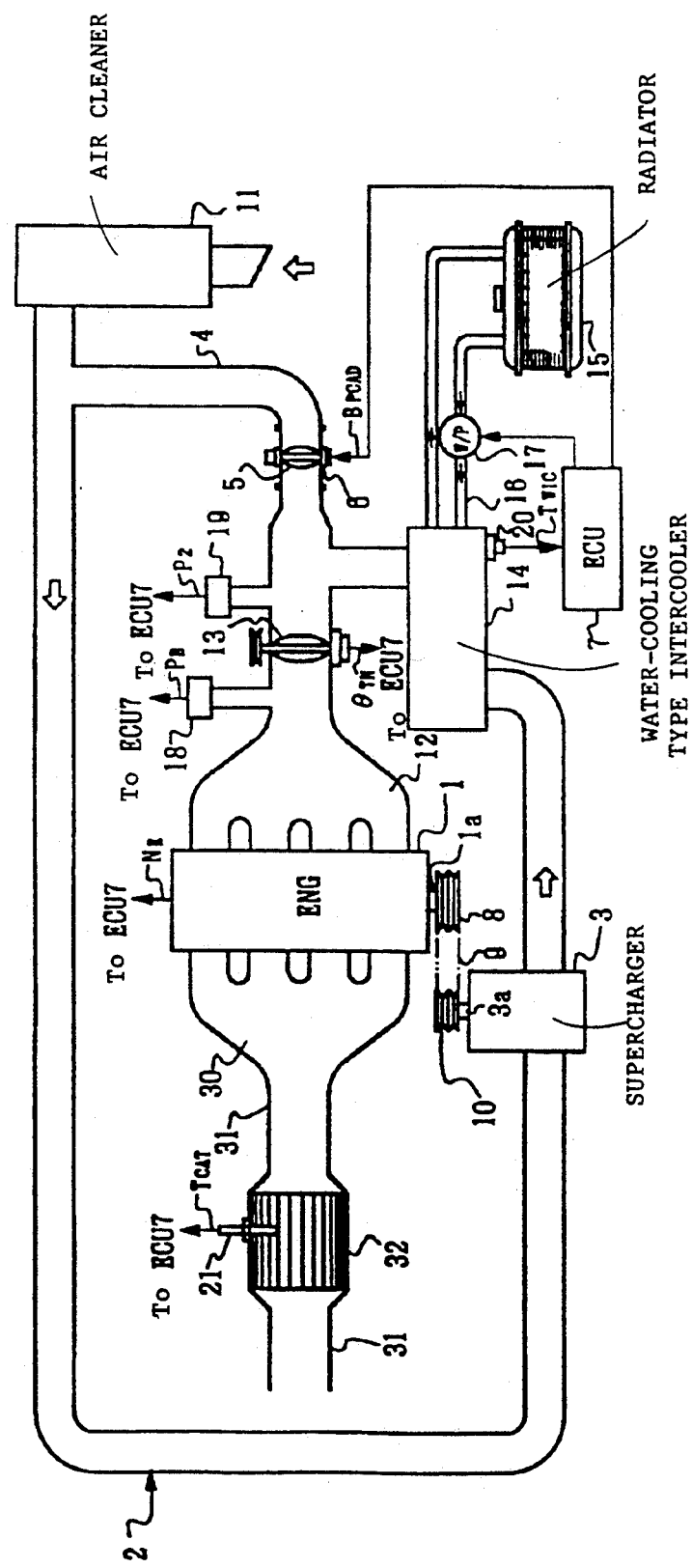
FIG. 1 is a schematic diagram showing the whole arrangement of a supercharging pressure control system for a supercharged internal combustion engine, according to a first embodiment of the invention.

Referring first to FIG. 1, there is shown a supercharging pressure control system for a supercharged internal combustion engine, according to a first embodiment of the invention. In the figure, reference numeral 1 designates an internal combustion engine, which has a supercharger 3 arranged in an intake passage 2 thereof. A bypass passage 4 is connected to the intake passage 2, which bypasses the supercharger 3. A supercharging pressure control valve 5 is arranged in the bypass passage 4 for opening and closing the bypass passage 4. A stepping motor (driving means) 6 is coupled to the control valve 5 for driving same. The stepping motor 6 is electrically connected to an electronic control unit (control unit) 7, hereinafter referred to as "the ECU", to be controlled by a signal therefrom. The engine 1 has a crankshaft 1a to which is connected a drive shaft 3a of the supercharger 3 via a pulley 8, a belt 9, and a pulley 10 so that the rotation of the crankshaft 1a is constantly transmitted to the drive shaft 3a.

An air cleaner 11 is arranged on an upstream end of the intake passage 2, while an intake manifold 12 forms a downstream end of the intake passage 2 for guiding intake air to an intake port of each cylinder of the engine 1. The supercharger 3 is arranged at a location upstream of a throttle valve 13. A water-cooling type intercooler 14 is arranged across the intake passage 2 at an intermediate location between the supercharger 3 and the throttle valve 13, for cooling intake air pressurized by the supercharger. The intercooler 14 is supplied with an engine coolant, which circulates under pressure through a radiator 15 and piping 16.

An exhaust manifold 30 and an exhaust pipe 31 are connected to the cylinder block of the engine 1. Exhaust gases exhausted from exhaust ports of the cylinders of the engine 1 are joined together via the exhaust manifold 30 into the exhaust pipe 31. A catalytic converter 32 is arranged across the exhaust pipe 31.

The ECU 7 is supplied with electric signals indicative of the engine rotational speed NE detected by an NE sensor, not shown, a supercharging pressure PB downstream of the throttle valve 13 detected by a PB sensor 18, a supercharging pressure P2 upstream of the throttle valve 13 detected by a P2 sensor 19, a throttle valve opening $\theta$TH detected by a $\theta$TH sensor, not shown, an intercooler coolant temperature TWIC detected by a coolant temperature sensor 20, and the temperature TCAT of the catalytic converter 32 detected by a CAT temperature sensor (temperature-detecting means) 21. Further, the temperature TCAT of the catalytic converter 32 (hereinafter simply referred to as "the CAT temperature TCAT") used throughout the present specification means the temperature of exhaust gases flowing into the inlet of the catalytic converter 32 or the temperature of the catalyst bed within the catalytic converter 32.

Figure 11:
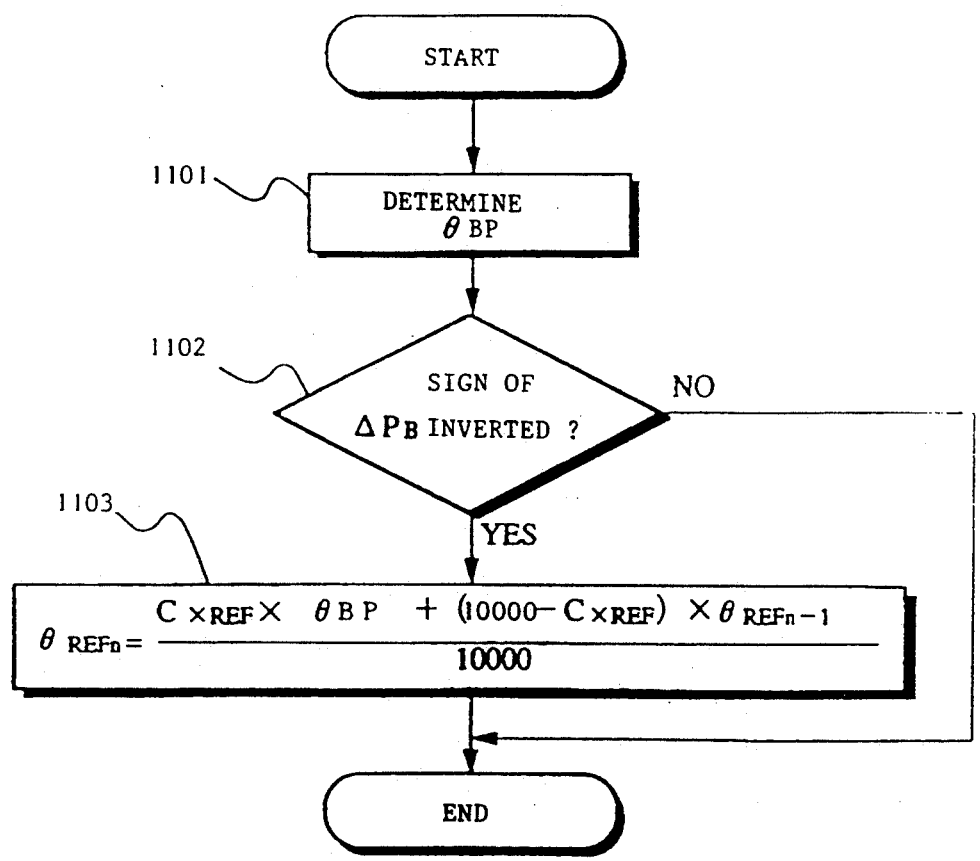
FIG. 11 is a flowchart showing a subroutine for calculating an average value of actual opening values of the supercharging pressure control valve detected during the feedback control.

The ECU 7 is constructed such that when the supercharging pressure P2 or PB upstream or downstream of the throttle valve 13 (hereinafter simply referred to as "the supercharging pressure PB") reaches a desired maximum supercharging pressure value POBJ (see FIG. 13), it changes the control mode of controlling supercharging pressure from an open-loop control mode to a feedback control mode in which the opening of the supercharging pressure control valve 5 is controlled so as to make the supercharging pressure Pb equal to the desired maximum supercharging pressure value POBJ, whereas when an average value $\theta$REF of actual opening values of the supercharging pressure control valve 5 (hereinafter referred to as "the averaged actual opening value") becomes smaller than a desired opening value $\theta$OBJ dependent upon current operating conditions of the engine, it changes the control mode from the feedback control mode to the open-loop control mode in which the opening of the supercharging pressure control valve 5 is controlled to the desired opening value $\theta$OBJ. In this embodiment, as will be described hereinafter with reference to FIG. 11, the averaged actual opening value $\theta$REF is calculated, based on actual values of the supercharging pressure control valve 5 calculated from a number BPCAD of pulses supplied from the ECU 7 to the stepping motor 6.

Figure 5:
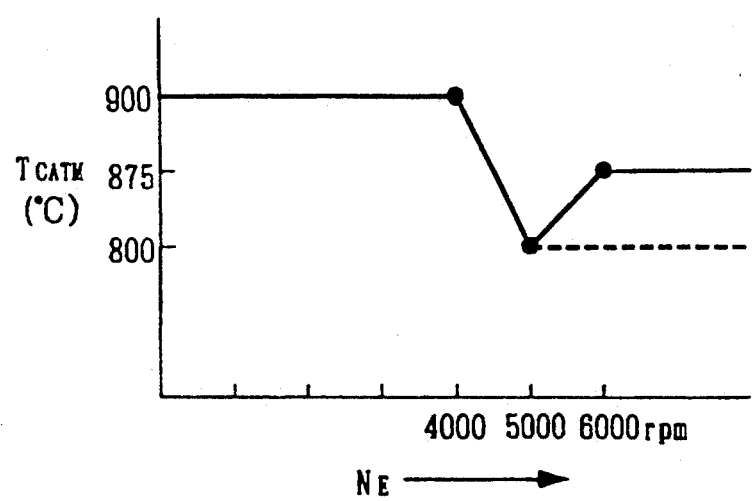
FIG. 5 shows a TCATM map showing values of the highest allowable value TCATM of the temperature of a catalytic converter appearing in FIG. 1, dependent on the rotational speed of the engine.

Further, the ECU 7 is constructed such that when the CAT temperature TCAT detected by the CAT temperature sensor 21 is higher than a predetermined value (the highest allowable value TCATM of the CAT temperature TCAT dependent on the engine rotational speed as shown in FIG. 5), it feedback-controls the opening of the supercharging pressure control valve 5 so as to make the supercharging pressure PB equal to a desired maximum supercharging pressure value POBJ (see FIG. 6) set according to the CAT temperature TCAT. In this connection, the highest allowable value TCATM (predetermined value) may be fixed to a constant value irrespective of the engine rotational speed NE.

The highest allowable value TCATM of the CAT temperature TCAT is calculated by retrieving a TCATM map stored in the memory means, not shown, of the ECU 7, in which optimum values of the highest allowable temperature TCATM are provided corresponding to values of the engine rotational speed NE.

As shown in FIG. 5, the highest allowable value TCATM is set, for example, such that it assumes a value of approx. 900° C. in a range of the engine rotational speed NE up to 4000 rpm, lowers from 900° C. to 850° C. as the engine rotational speed NE increases from 4000 to 5000 rpm, rises from 850° C. to 875° C. as the engine rotational speed NE increases from 5000 to 6000 rpm, and assumes a value of approx. 875° C. in an NE range higher than 6000 rpm.

The highest allowable value TCATM is set as described above, for the following reasons: When the engine rotational speed NE is in a range up to 4000 rpm, the flow rate of exhaust gases is low, so that there is almost no fear of deterioration of the catalytic converter 32 even if the highest allowable value TCATM is set to a high value. When the engine rotational speed NE is in a range of 4000 to 5000 rpm, the exhaust gas flow rate is high, so that there is a fear of deterioration of the catalytic converter 32 due to a sharp increase in the CAT temperature TCAT with an increase in the engine rotational speed NE unless the highest allowable temperature is set to a lower value. When the engine rotational speed NE is in a range of 5000 to 6000 rpm, although the exhaust gas flow rate increases, this range is used less frequently than the range of 4000 to 5000 rpm, so that there is almost no fear of deterioration of the catalytic converter 32 even if the highest allowable value is set to a higher value as the engine rotational speed NE increases.

Thus, the highest allowable value TCATM of the CAT temperature TCAT can be set in a manner matching characteristics of the internal combustion engine used. In the present embodiment, the highest allowable value TCATM is set such that it affords compatibility of improved travelling performance of a vehicle (driveability, fuel consumption) in which the engine is installed and protection of the catalytic converter 32.

Figure 6:
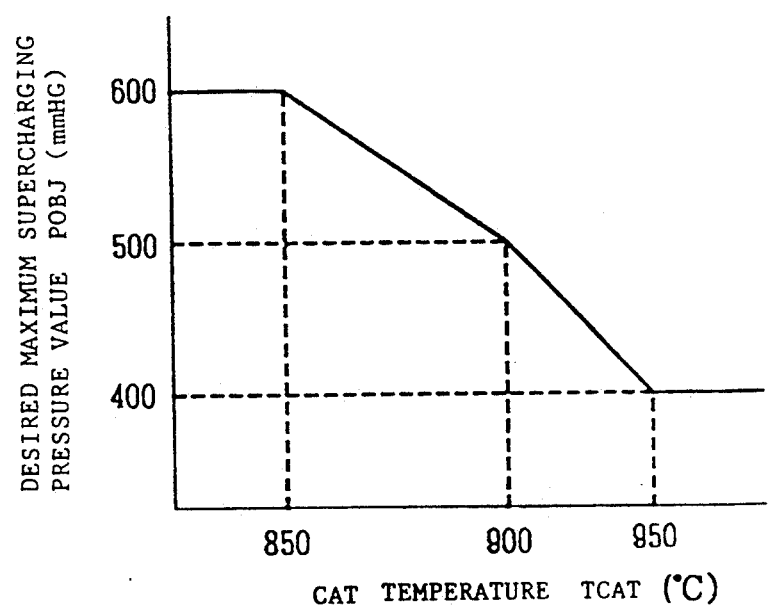
FIG. 6 shows a POBJ map for determining a desired maximum value POBJ of supercharging pressure dependent on the temperature of the catalytic converter.

Further, the desired maximum supercharging pressure value POBJ applied when the actual value of the CAT temperature TCAT is higher than the highest allowable value TCATM (predetermined value) is determined by retrieving a POBJ map stored in the memory means of the ECU 7, which is set, e.g. as shown in FIG. 6, such that optimum values of the desired maximum supercharging pressure value POBJ are provided corresponding to values of the CAT temperature TCAT. As shown in the figure, the maximum supercharging pressure value POBJ assumes a lower value as the CAT temperature TCAT rises.

The operation of the supercharging pressure control system constructed as above will now be described.

Figure 3:
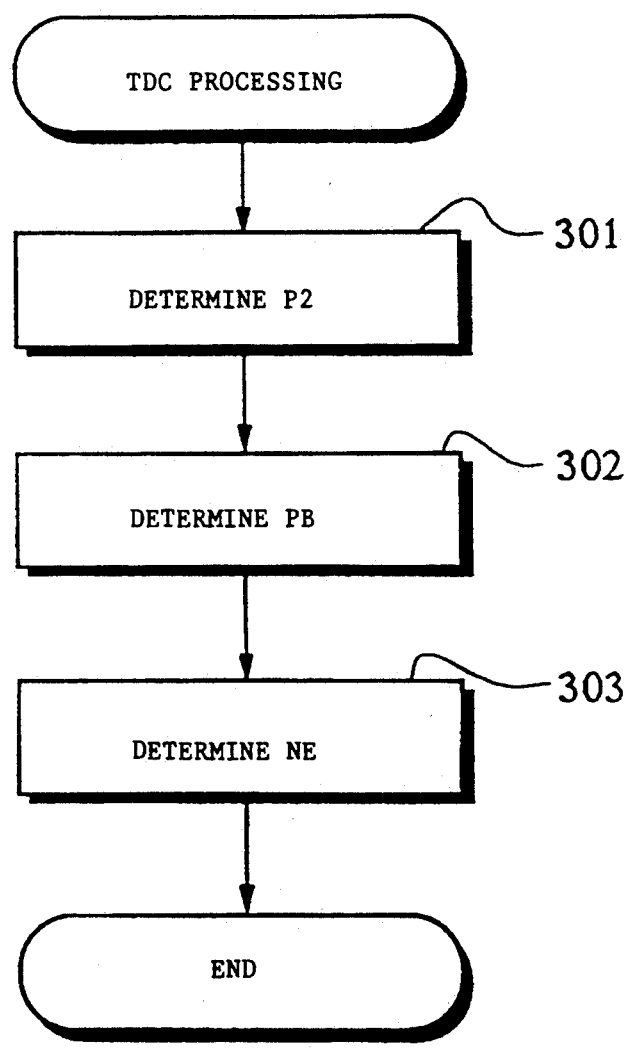
FIG. 3 is a flowchart showing a subroutine for performing a TDC processing.

First, the ECU 7 executes a TDC processing as illustrated in FIG. 3. In the TDC processing, the supercharging pressure P2 is determined based on an electric signal indicative of the supercharging pressure P2 upstream of the throttle valve 13 detected by the P2 sensor 19, at a step 301. Then, the supercharging pressure PB is determined based on an electric signal indicative of the supercharging pressure PB downstream of the throttle valve 13 detected by the PB sensor 18, at a step 302. Further, at a step 303, the engine rotational speed NE is determined based on an electric signal indicative of the engine rotational speed NE detected by the NE sensor, followed by terminating the program. This TDC processing is executed whenever a TDC signal pulse indicative of a TDC position of each cylinder is generated. Newly-determined values of the supercharging pressure P2, the supercharging pressure PB, and the engine rotational speed NE are stored into the memory means of the ECU 7 whenever the TDC processing is carried out.

Figure 2:
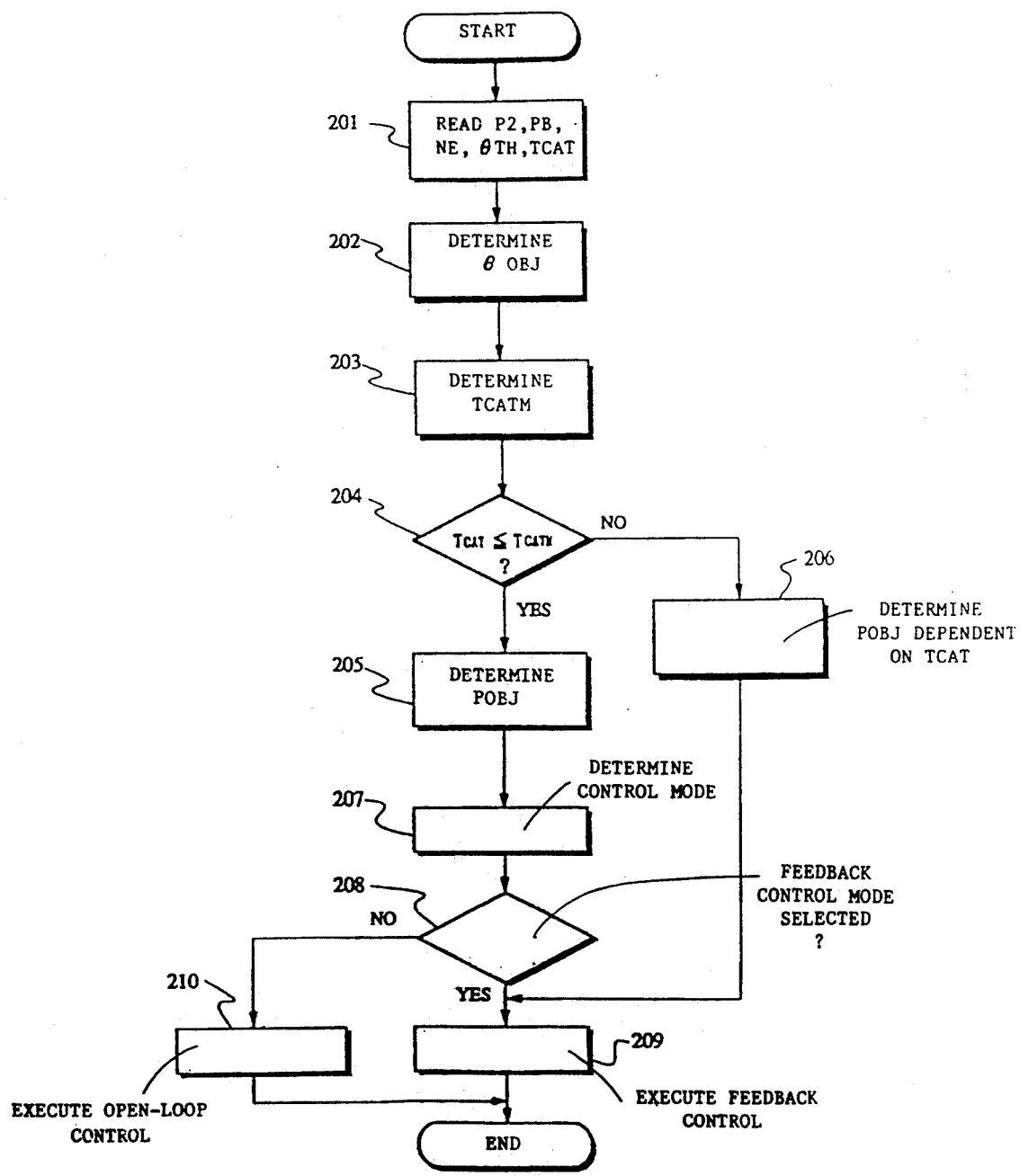
FIG. 2 is a flowchart showing a main routine for performing supercharging pressure control by the supercharging pressure control system shown in FIG. 1.

Following the execution of the TDC processing, the ECU 7 carries out a main routine shown in FIG. 2. This main routine shown in FIG. 2 is carried out at regular time intervals. In the main routine, first at a step 201, a CPU, not shown, of the ECU 7 reads values of the supercharging pressure P2, the supercharging pressure PB, and the engine rotational speed NE determined and stored by the above described TDC processing, as well as values of the throttle valve opening $\theta$TH of the throttle valve 13, and the CAT temperature TCAT, determined and stored based on electric signals supplied from the $\theta$TH sensor and the CAT temperature sensor 12, mentioned above, respectively.

Figure 4:
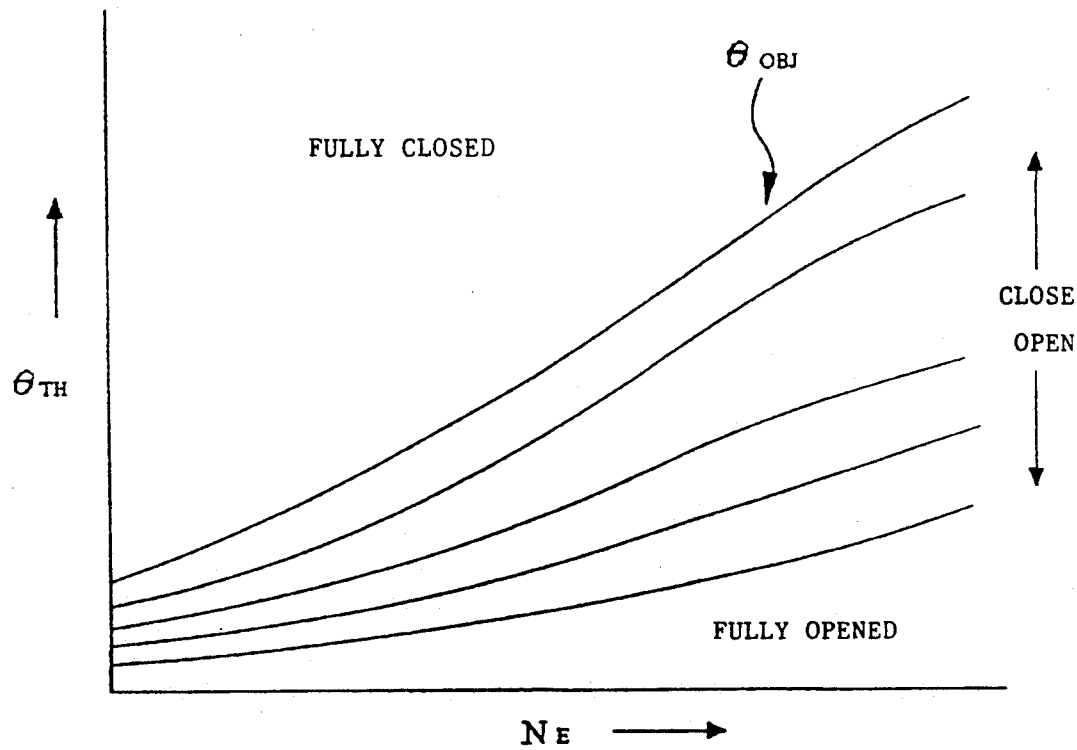
FIG. 4 shows a $\theta$OBJ map for determining a desired opening value $\theta$OBJ of a supercharging pressure control valve, used in open-loop control of supercharging pressure.

Then, the program proceeds to a step 202, where the desired opening value $\theta$OBJ of the supercharging control valve 5 is calculated. The desired opening value $\theta$OBJ is calculated by retrieving a $\theta$OBJ map stored in the memory means of the ECU 7, which is set, e.g. as shown in FIG. 4, such that optimum values of the desired opening value $\theta$OBJ of the control valve 5 are provided corresponding to values of the engine rotational speed NE and the throttle valve opening $\theta$TH.

Following the calculation of the desired opening value $\theta$OBJ of the control valve 5, the program proceeds to a step 203, where the highest allowable value TCATM of the CAT temperature TCAT is calculated by retrieving a TCATM map stored in the memory means of the ECU 7, which is set, e.g. as shown in FIG. 5, such that optimum values of the highest allowable value TCATM are provided corresponding to values of the engine rotational speed NE.

Then, the program proceeds to a step 204, where it is determined whether or not the CAT temperature TCAT detected is equal to or lower than the highest allowable value TCATM. If the answer to the question of the step 204 is affirmative (YES), i.f. if TCAT≦TCATM, the program proceeds to a step 205, where the desired maximum supercharging pressure value POBJ for the feedback control mode is calculated.

Figure 7:
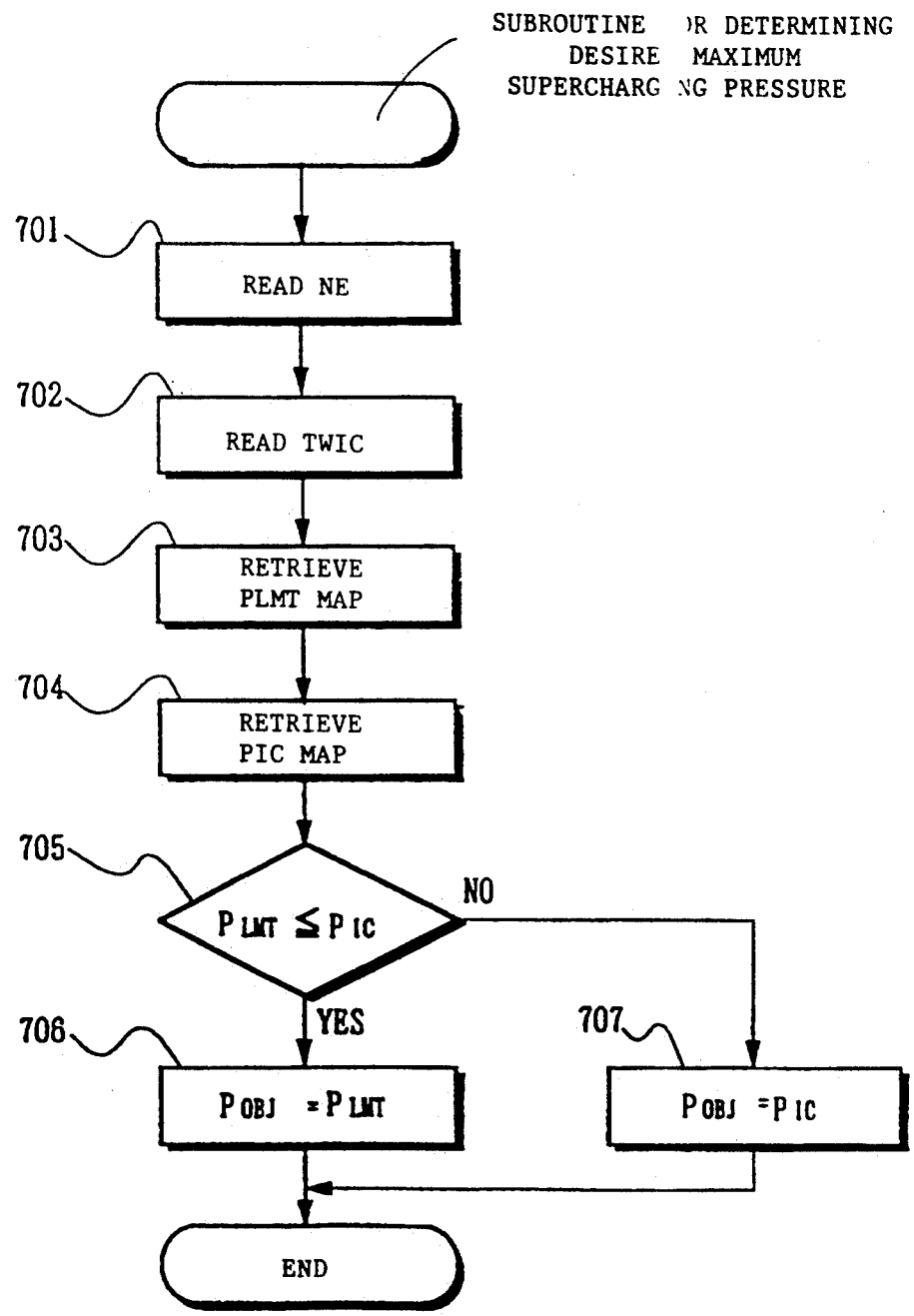
FIG. 7 is a flowchart of a subroutine for determining the desired maximum supercharging pressure value POBJ.
Figure 8:
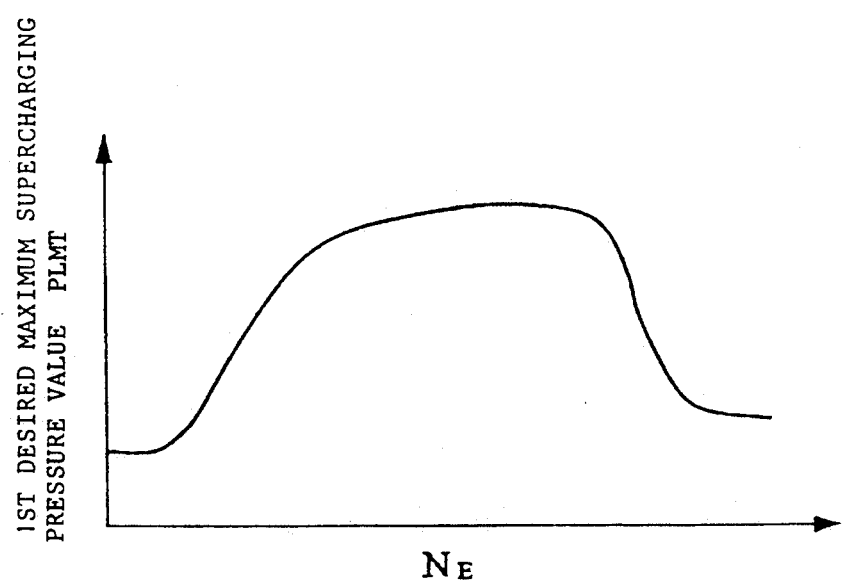
FIG. 8 shows a PLMT map for determining a first desired maximum value PLMT of supercharging pressure dependent on the rotational speed of the engine.
Figure 9:
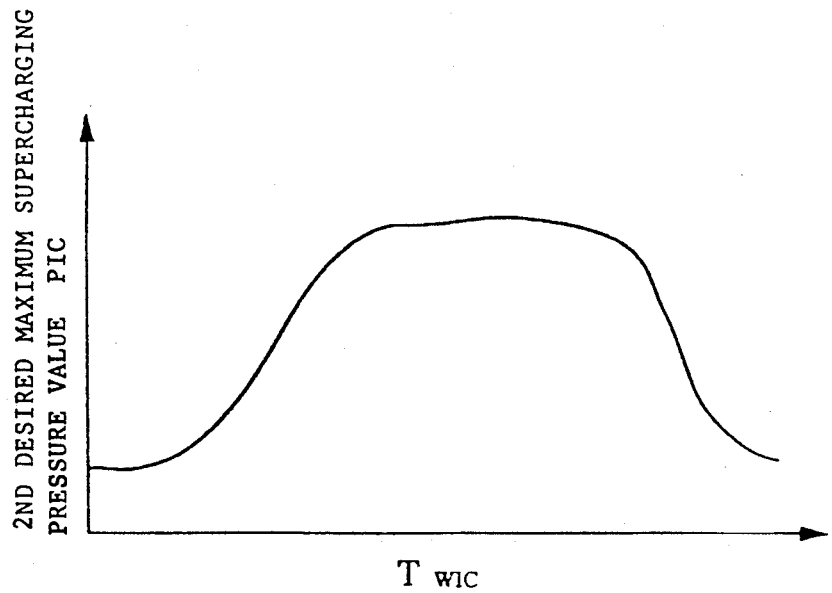
FIG. 9 shows a PIC map for determining a second desired maximum value PIC of supercharging pressure dependent on the temperature of an intercooler.

The calculation of the desired maximum supercharging pressure value POBJ at the step 205 of the main routine is effected by execution of a subroutine for determining the desired maximum supercharging pressure value POBJ, shown in FIG. 7. In this subroutine, the newest value of the engine rotational speed NE is read again at a step 701, and the newest value of the intercooler coolant temperature TWIC detected by the coolant temperature sensor 20 is read at a step 702. Then, the program proceeds to a step 703, where a first desired maximum supercharging pressure value PLMT dependent on the engine rotational speed NE is calculated by retrieving a PLMT map stored in the memory means of the ECU 7, which is set, e.g. as shown in FIG. 8, such that optimum values of the first desired supercharging pressure value PLMT are provided corresponding to values of the engine rotational speed NE. Then, at a step 704, a second desired maximum supercharging pressure PIC depending on the intercooler coolant temperature TWIC is calculated by retrieving a PIC map stored in the memory means of the ECU 7, which is set, e.g. as shown in FIG. 9, such that optimum values of the second desired supercharging pressure PIC are provided corresponding to values of the intercooler coolant temperature TWIC. Then, the program proceeds to a step 705, where it is determined whether or not the first desired maximum supercharging pressure value PLMT is equal to or lower than the second desired maximum supercharging pressure value PIC. If the answer to this question is affirmative (YES), i.e. if PLMT≦PIC, the desired supercharging pressure value POBJ is set to the first desired maximum supercharging pressure value PLMT at a step 706, whereas if the answer to this question is negative (NO), i.e. if PLMT>PIC, the desired supercharging pressure value POBJ is set to the second desired maximum supercharging pressure value PIC at a step 707, followed by returning to the main routine of FIG. 2.

Following the decision of the desired maximum supercharging pressure POBJ at the step 205, the program returns to a step S207, where the control mode of controlling supercharging pressure is determined between the open-loop control mode and the feedback control mode.

Figure 10:
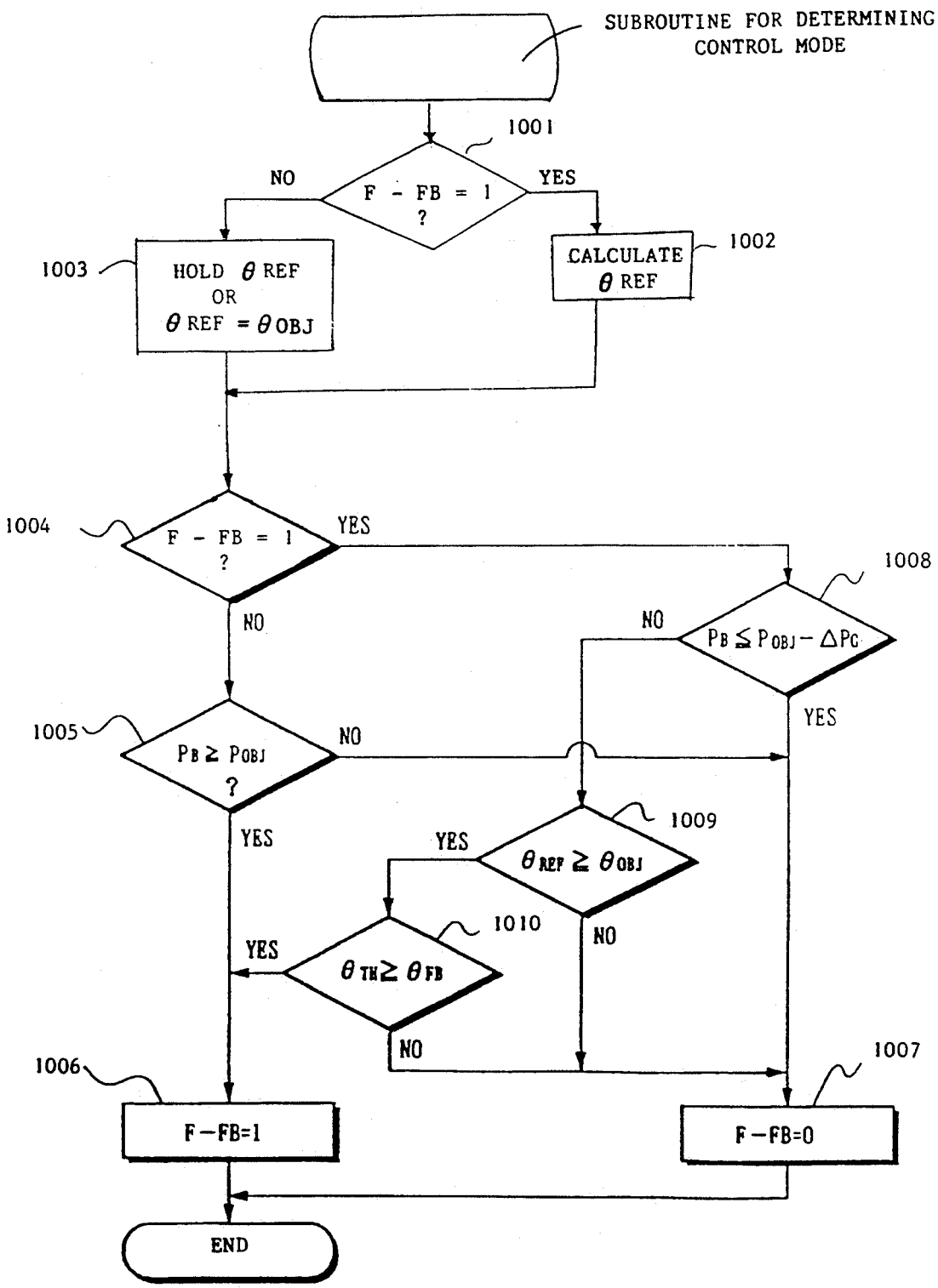
FIG. 10 is a flowchart showing a subroutine for determining the control mode.

The determination of the control mode at the step 207 is executed by executing a subroutine for determining the control mode, shown in FIG. 10.

In this subroutine, first at a step 1001, it is determined whether or not the feedback control of supercharging pressure is being carried out by determining whether or not a control mode-indicating flag F-FB is equal to 1. If the answer to this question is affirmative (YES), i.e. if during the feedback control, the program proceeds to a step 1002, where the averaged actual opening value $\theta$REF is calculated, and then to a step 1004. The calculation of the averaged actual value $\theta$REF at the step 1002 is effected by executing a subroutine shown in FIG. 11. In this $\theta$REF-calculating subroutine, first at a step 1101, an actual opening value $\theta$BP of the supercharging pressure control valve 5 is determined based on the number of pulses supplied from the ECU 7 to the stepping motor 6. Then, at a step 1102, it is determined whether or not the sign of a value of $\Delta$PB ($\Delta$PB=the desired maximum supercharging pressure value POBJ—the supercharging pressure PB) has been inverted. If the answer to this question is affirmative (YES), i.e. if the sign has been inverted, the program proceeds to a step 1103, where there is calculated a present value $\theta$REFn of the averaged actual opening value $\theta$REF of the supercharging pressure control valve 5 assumed during the feedback control, followed by returning to the control mode-determining subroutine of FIG. 10, whereas if the answer to the question is negative (NO), i.e. the sign has not been inverted, this subroutine is terminated, i.e. the program returns to the control mode-determining subroutine in FIG. 10, without calculating a new value $\theta$REFn of the averaged actual value $\theta$REF.

On the other hand, if the answer to the question of the step 1001 in FIG. 10 is negative (NO), i.e. if during the open-loop control, the program proceeds to a step 1003, where the averaged actual opening value $\theta$REF is held to an immediately preceding value thereof ($\theta$REFn-1) or set to the desired opening value $\theta$OBJ depending on the supercharging pressure PB, and then proceeds to the step 1004.

At the step 1004, it is determined whether or not the feedback control of supercharging pressure is being effected by determining whether or not the control mode-indicating flag F-FB is equal to 1. If the answer to this question is negative (NO), i.e. if during the open-loop control, the program proceeds to a step 1005, where it is determined whether or not the supercharging pressure PB is equal to or higher than the desired maximum supercharging pressure POBJ calculated at the step 205 in FIG. 2. If the answer to this question is affirmative (YES), i.e. if the supercharging pressure PB has become equal to or higher than the desired maximum supercharging pressure POBJ during the open-loop control, the control mode-indicating flag F-FB is set to "1" at a step S1006 to indicate that the feedback control mode has been selected, followed by terminating the subroutine of FIG. 10 and returning to the main routine of FIG. 2. On the other hand, if the answer to the question of the step 1005 is negative (NO), i.e. if the supercharging pressure PB is lower than the desired maximum supercharging pressure POBJ, during the open-loop control, the flag F-FB is set to "0" at a step 1007 to indicate that the open-loop control mode has been selected, followed by terminating the subroutine of FIG. 10 and returning to the main routine of FIG. 2.

On the other hand, if the answer to the question of the step 1004 is affirmative (YES), i.e. if during the feedback control, the program proceeds to a step 1008, where it is determined whether or not the supercharging pressure PB is equal to or lower than a value (POBJ−$\Delta$PG) obtained by subtracting $\Delta$PG from the desired maximum supercharging pressure POBJ. $\Delta$PG is set for the purpose of providing hysteresis for prevention of hunting. If the answer to the question of the step 1008 is affirmative (YES), i.e. if PB≦ POBJ−$\Delta$PC, the program proceeds to the step 1007, where the flag F-FB is set to "0" to indicate that the open-loop control mode has been selected, whereas if the answer to the question of the step 1008 is negative (NO), i.e. if PB> POBJ−$\Delta$PC, the program proceeds to a step 1009, where it is determined whether or not the averaged actual opening value $\theta$REF is equal to or higher than the desired opening value θOBJ. If the answer to this question is negative (NO), i.e. if θREF< θOBJ, it is judged that the engine is in a state in which the supercharging pressure PB should be decreased, judging from the present operating condition of the engine, i.e. present values of the engine rotational speed NE and the throttle valve opening θTH, and if the feedback control is continued, the supercharging pressure will be further increased. Then, the program proceeds to the step 1007.

Figure 12:
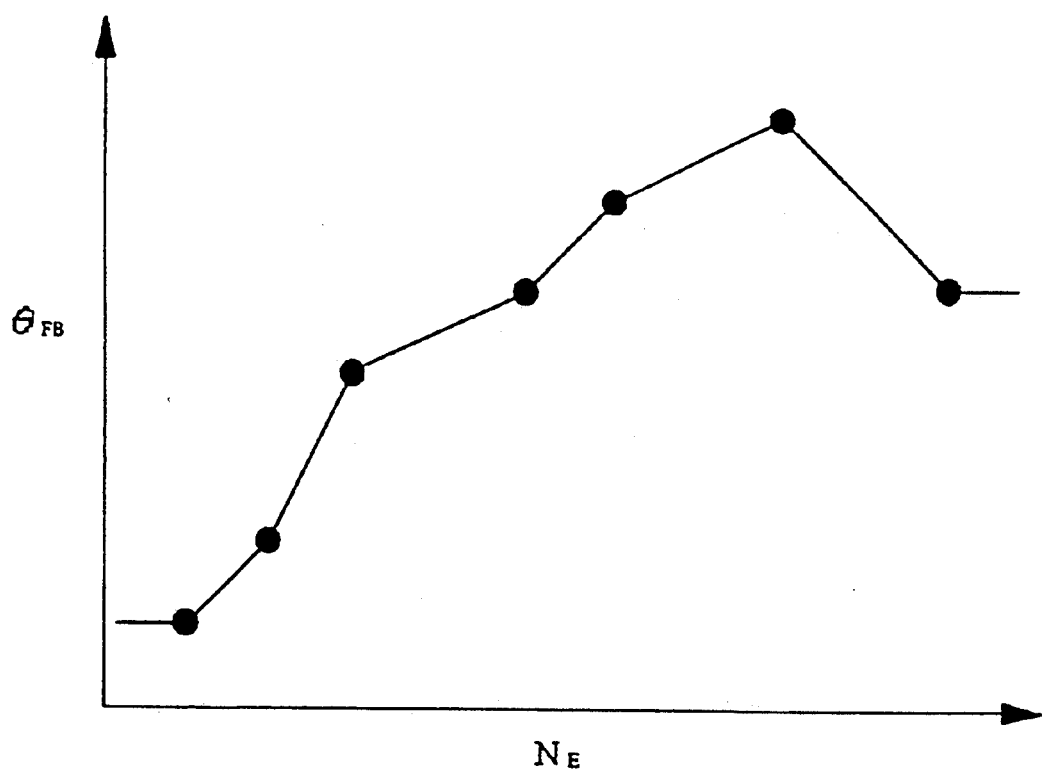
FIG. 12 shows a $\theta$FB map for determining a basic throttle valve opening value $\theta$FB of a throttle valve dependent on the rotational speed of the engine.

On the other hand, if the answer to the question of the step 1009 is affirmative (YES), i.e. if θREF≧θOBJ, it is judged that the engine is in a state in which the supercharging pressure PB should be increased, judging from the present operating condition, i.e. present values of the engine rotational speed NE and the throttle valve opening θTH, and hence the feedback control should be continued. Then, the program proceeds to a step 1010, where it is determined whether the throttle valve opening θTH is equal to or higher than a reference throttle valve opening value θFB. The reference throttle valve opening value θFB is a parameter varying with the engine rotational speed NE, a θFB map of which is stored in the memory means of the ECU 7. The map is set, as shown in FIG. 12, such that optimum values of the reference throttle valve opening value θFB are provided corresponding to values of the engine rotational speed NE. If the answer to the question of the step 1010 is negative (NO), i.e. if the throttle valve opening θTH has suddenly changed below the reference throttle valve opening value θFB, the program proceeds to the step S1007. On the other hand, if the answer to the question of the step 1010 is affirmative (YES), i.e. if θTH≧θFB, the program proceeds to the step 1006, where the flag F-FB is set to "1".

After thus determining the control mode at the step 207 in FIG. 2, the program proceeds to a step 208, where it is determined whether or not the control mode selected at the step 207 is the feedback control mode. If the answer to this question is affirmative (YES), the program proceeds to a step 209 where the feedback control is carried out, i.e. the feedback control is continued if the feedback control has been carried out, and the feedback control is started if the open-loop control has been carried out. In the present case, i.e. the feedback control to be carried out at the step 209, which is reached when the answer to the question of the step 204 is affirmative (YES), is carried out by controlling the opening of the supercharging pressure control valve 5 so as to make the supercharging pressure PB read at the step 201 equal to the desired maximum supercharging pressure POBJ calculated at the step 205.

On the other hand, if the answer to the question of the step 208 is negative (NO), the program proceeds to a step 210, where the open-loop control is executed, i.e. the open-loop control is continued if it has been carried out, while the open-loop control is started if the feedback control has been carried out. The open-loop control is carried out by controlling the opening of the supercharging pressure control valve 5 to the desired opening value θOBJ calculated at the step 202.

On the other hand, if the answer to the question of the step 204 is negative (NO), i.e. when the CAT temperature TCAT becomes higher than the highest allowable value TCATM, it is judged that there is a fear that the catalytic converter 32 is deteriorated due to high temperature, so that the program proceeds to a step 206, where the desired maximum supercharging pressure POBJ is calculated by retrieving the aforementioned POBJCAT map.

Following the execution of the step 206, the program proceeds to the step 209, where the feedback control is carried out. In the present case, the feedback control is carried out by controlling the opening of the supercharging pressure control valve 5 so as to make the supercharging pressure PB read at the step 201 equal to the desired maximum supercharging pressure POBJ determined at the step 206. In this connection, it should be noted that in the POBJ map of FIG. 6, the desired maximum supercharging pressure POBJ is set such that it decreases as the CAT temperature TCAT becomes higher. Therefore, by carrying out this feedback control, the supercharging pressure PB decreases with an increase in the CAT temperature TCAT (e.g. when the CAT temperature TCAT assumes a value of 900° C., the supercharging pressure PB drops to a value of POBJ=500 mmHg), whereby the exhaust gas temperature becomes lower. This enables to prevent the catalytic converter 32 from being deteriorated due to high temperature, i.e. protect the catalytic converter 32.

According to the first embodiment described above, when the CAT temperature TCAT becomes higher than the highest allowable value TCATM, the exhaust gas temperature is decreased by controlling the opening of the supercharging pressure control valve 5 in such a manner that the supercharging pressure PB is decreased according to the CAT temperature TCAT, without holding the air-fuel ratio of the air-fuel mixture supplied to the engine to a value richer than the stoichiometric value. Therefore, it is possible to protect the catalytic converter 32 from being exposed to a high exhaust gas temperature without degrading the exhaust gas emission characteristics and fuel consumption.

Next, a second embodiment of the invention will be described with reference to drawings, particularly to FIGS. 14 and 15. In the second embodiment, the ECU 7 is supplied with an electric signal indicative of the vehicle speed V detected by a vehicle speed sensor, not shown, as well as other signals described in the first embodiment.

Further, the ECU 7 is constructed such that when the CAT temperature TCAT detected by the CAT temperature sensor 21 during idling of the engine is lower than a predetermined value (e.g. 250° C.), it feedback-controls the opening of the supercharging pressure control valve 5 so as to make the supercharging pressure PB equal to a desired supercharging pressure PMAP dependent on the CAT temperature TCAT.

The operation of the second embodiment having the above construction will now be described.

First, the ECU 7 executes the TDC processing in the same manner as in the first embodiment described with reference to FIG. 3.

Figure 14:
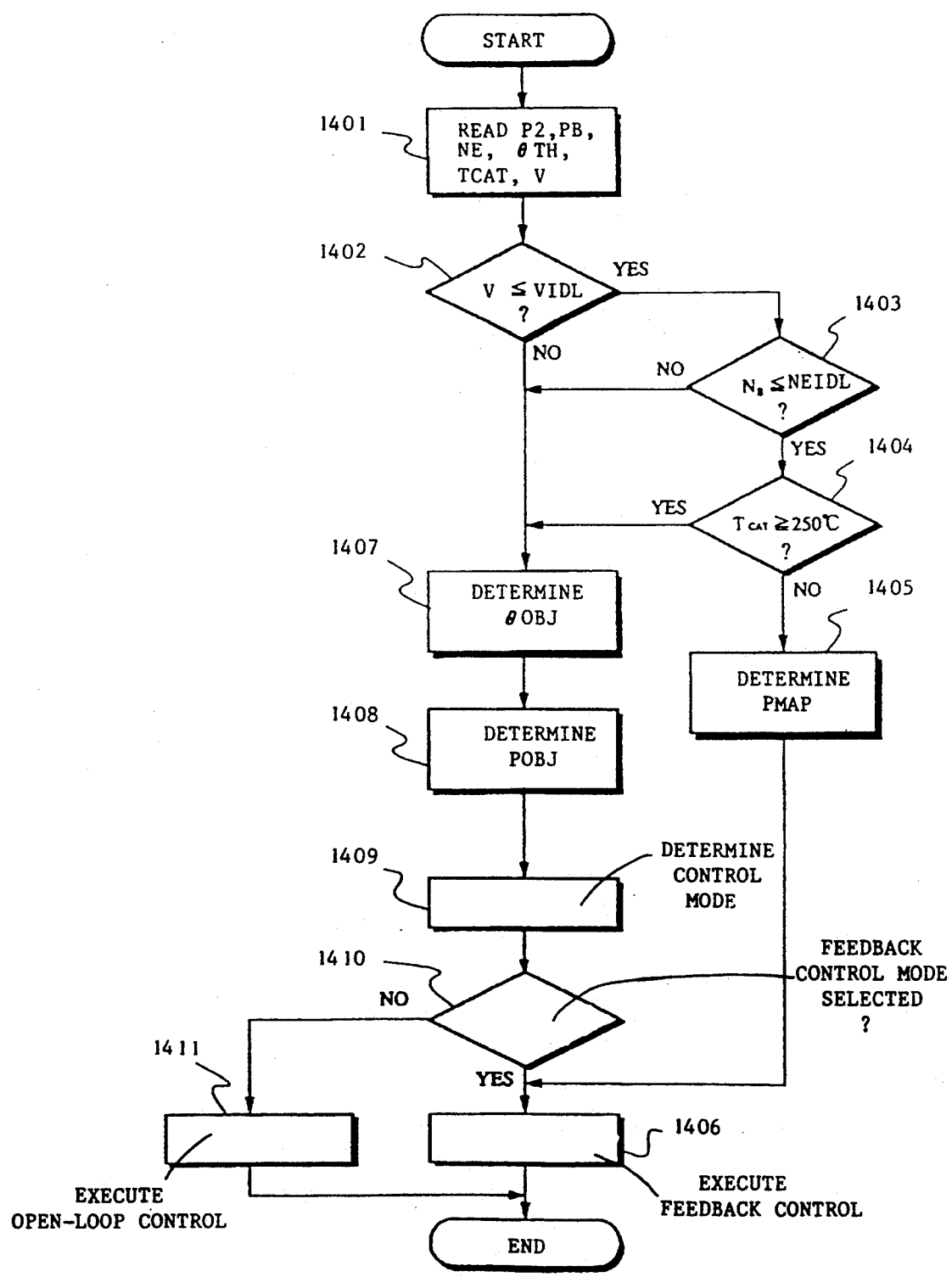
FIG. 14 is a flowchart showing a main routine for performing supercharging pressure control by a supercharging pressure control system according to a second embodiment of the invention.

Following the execution of the TDC processing, the ECU 7 executes a main routine shown in FIG. 14. This main routine is carried out at regular time intervals. In this main routine, at a step 1401, values of the supercharging pressure P2, PB, and the engine rotational speed NE determined and stored in the TDC processing, as well as values of the throttle valve opening θTH of the throttle valve 13, the CAT temperature TCAT, and the vehicle speed V, determined based on electric signals supplied from the θTH sensor, the CAT temperature sensor 12, and the vehicle speed sensor, mentioned above, respectively, and stored. Then, it is determined at a step 1402 whether or not the vehicle speed VSP is equal to or lower than a predetermined value VIDL. If the answer to this question is affirmative (YES), i.e. if V≦VIDL, it is determined at a step 1403 whether or not the engine rotational speed NE is equal to or lower than a predetermined value NEIDL. If the answer to this question is affirmative (YES), i.e. if NE≦NEIDL, which means that the engine is idling, the program proceeds to a step 1404, where it is determined whether or not the CAT temperature TCAT is equal to or higher than the aforementioned predetermined value (250° C.).

If the answer to the question of the step 1404 is negative (NO), i.e. if TCAT<250° C., the desired supercharging pressure PMAP dependent upon the CAT temperature TCAT is determined at a step 1405, followed by the program proceeding to a step 1406, where the opening of the supercharging pressure control valve 5 is feedback-controlled so as to make the supercharging pressure PB equal to the desired supercharging pressure PMAP, followed by terminating the routine.

In the cases where the answer to the question of the step 1402 is negative (NO), i.e. if the vehicle speed V is higher than the predetermined value VIDL (which means that the engine is not idling), if the answer to the question of the step 1403 is negative (NO), i.e. NE>NEIDL (which means that the engine is not idling), or if the answer to the question of the step 1404 is affirmative (YES), i.e. the CAT temperature TCAT is equal to or higher than the predetermined value (250° C.) during idling of the engine, the program proceeds to a step 1407, where the desired opening value θOBJ of the supercharging pressure control valve 5 to be applied in the feedback control mode is calculated in the same manner as in the first embodiment described with reference to FIG. 4. Then, at a step 1408, the desired maximum supercharging pressure POBJ to be applied in the feedback control mode is calculated in the same manner as in the first embodiment described with reference to FIG. 7. At the following step 1409, the control mode is selected between the open-loop control mode and the feedback control mode, in the same manner as in the first embodiment described with reference to FIG. 10. Then, at a step 1410, it is determined whether or not the control mode selected at the step 1409 is the feedback control mode. If the answer to this question is affirmative (YES), the program proceeds to the step 1406, where the feedback control is carried out. In this case, the opening of the supercharging pressure control valve 5 is feedback-controlled such that the supercharging pressure PB read at the step 1401 becomes equal to the desired maximum supercharging pressure POBJ calculated at the step 1408. On the other hand, if the answer to the question of the step 1410 is negative (NO), the program proceeds to a step 1411, where the open-loop control is carried out. The open-loop control is effected by controlling the opening of the supercharging pressure control valve 5 to the desired opening value θOBJ calculated at the step 1407.

Figure 15:
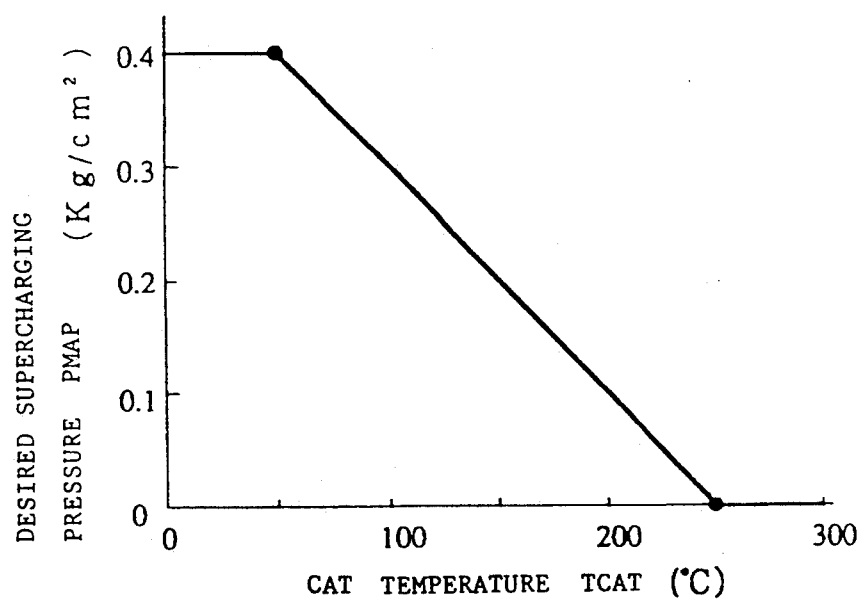
FIG. 15 shows a PMAP map for determining a desired value PMAP of supercharging pressure.

At the above-mentioned step 1405, the desired supercharging pressure PMAP is calculated by retrieving a PMAP map stored in the memory means of the ECU 7, which is set, as shown in FIG. 15, such that optimum values of the desired supercharging pressure PMAP are provided corresponding to values of the CAT temperature TCAT. More specifically, the desired supercharging pressure PMAP is calculated by retrieving the PMAP map shown in FIG. 15 according to the newest value of the CAT temperature TCAT read at the step 1401.

Figure 13:
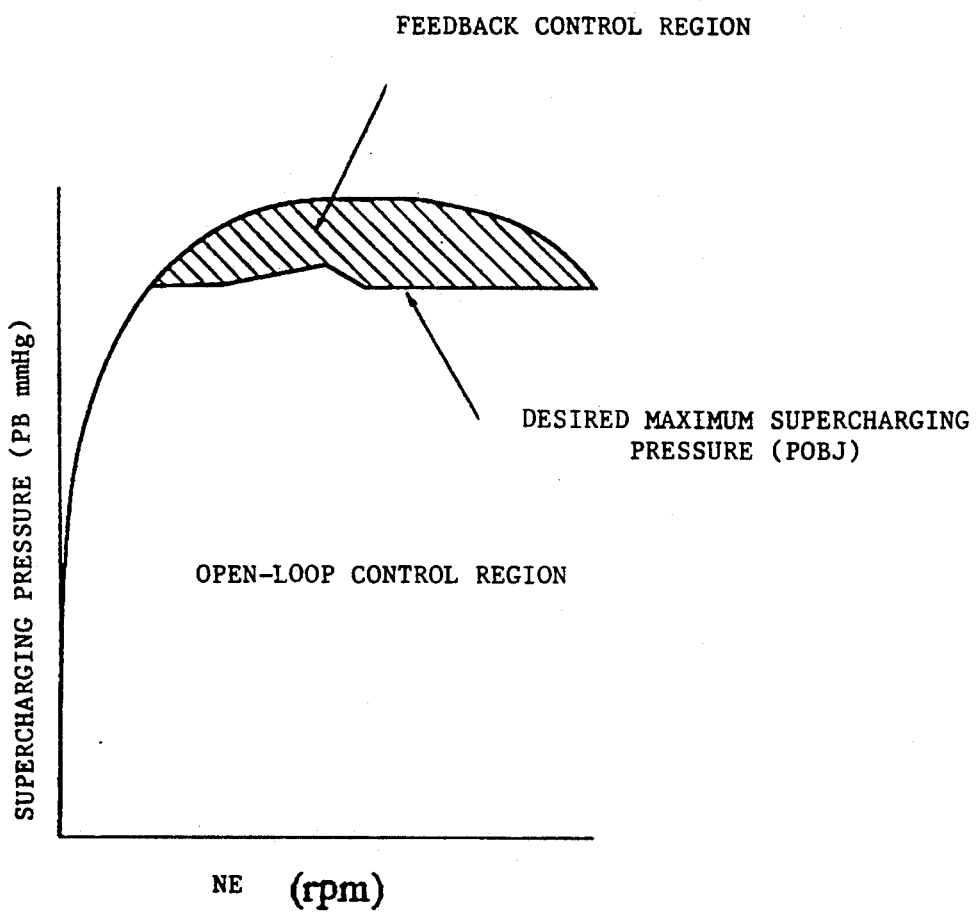
FIG. 13 is a diagram illustrating an open-loop control region and a feedback control region.

As described above, according to the second embodiment, when the engine is not idling (when the vehicle speed V is higher than the predetermined value VIDL, or when the vehicle speed V is not higher than the predetermined value VIDL and at the same time the engine rotational speed NE is higher than the predetermined value NEIDL), and when the engine is idling (when V≦VIDL and NE≦NEIDL) and at the same time the CAT temperature TCAT is equal to or higher than the predetermined value (250° C.), the supercharging pressure PB is feedback-controlled, as shown in FIG. 13, in a region where the supercharging pressure PB is equal to or higher than the desired maximum supercharging pressure POBJ, while the supercharging pressure PB is controlled in an open-loop manner, in a region where the supercharging pressure PB is lower than the desired supercharging pressure POBJ. By thus controlling the supercharging pressure, the speed and accuracy of supercharging pressure control are improved. Moreover, according to the feedback control, the opening of the supercharging pressure control valve 5 is controlled such that the supercharging pressure PB becomes equal to the desired maximum supercharging pressure POBJ, which enables to prevent the supercharging pressure PB from rising to an abnormally high level.

Further, according to the second embodiment, when the CAT temperature TCAT is lower than the predetermined value (250° C.) during idling of the engine, the desired supercharging pressure PMAP is determined according to the CAT temperature TCAT, and the opening of the supercharging pressure control valve 5 is feedback-controlled in such a manner that the supercharging pressure PB becomes equal to the desired supercharging pressure. This enables to effect supercharging of intake air in dependence on the CAT temperature TCAT until the exhaust gas temperature exceeds the predetermined value, so that the purifying efficiency (reactivity) of the catalytic converter 32 can be enhanced quickly. As a result, the exhaust gases can be more effectively purified during travelling of the vehicle, leading to an improvement in the exhaust gas emission characteristics. Further, since the warming-up of the engine is effected without increasing the idling engine rotational speed, this enables to prevent occurrence of noise and disturbing vibrations during the warming-up of the engine.

In both of the first and second embodiments described above, a mechanical type supercharger driven by the engine 1 is employed as the supercharger 3 arranged in the intake passage 2 of the engine 1, and a valve adapted to open and close the bypass passage 4 bypassing the supercharger 3 is employed as the supercharging pressure control valve 5, the opening of which is controlled to control the supercharging pressure. However, this is not limitative, but the supercharging pressure control system of the present invention may be also applied to an internal combustion engine including a compressor as the supercharger, which compressor is driven by an exhaust gas turbine which is caused to rotate by the energy of exhaust gases, i.e. a so-called turbocharger, and a waste gate valve for controlling the amount of exhaust gases supplied to the exhaust turbine, as the supercharging pressure control valve, in which the opening of the waste gate valve is controlled to control the supercharging pressure.

What is claimed is:

1. In a supercharging pressure control system for a supercharged internal combustion engine including an intake passage, a supercharger arranged in said intake passage, an exhaust passage, and a catalytic converter arranged in said exhaust passage, said supercharging pressure control system comprising a bypass passage connected to said intake passage such that said bypass passage by-passes said supercharger, a supercharging pressure control valve arranged in said bypass passage for controlling supercharging pressure of intake air supplied to said engine, by said supercharger, driving means for driving said supercharging pressure control valve, control means for controlling said supercharging pressure of intake air by operating said driving means, and temperature-detecting means for detecting the temperature of said catalytic converter, the improvement wherein said control means includes determining means for determining whether or not said temperature of said catalytic converter detected by said temperature-detecting means falls within a predetermined range, said control means controlling said supercharging pressure to a desired level dependent on said temperature of said catalytic converter by way of said supercharging pressure control valve driven by said driving means to thereby bring said temperature of said catalytic converter into said predetermined range when said temperature of said catalytic converter falls outside said predetermined range.

2. A supercharging pressure control system according to claim 1, including a sensor for detecting the rotational speed of said engine, wherein said predetermined range has an upper limit value determined by the rotational speed of said engine detected by said sensor.

3. A supercharging pressure control system according to claim 2, wherein said upper limit value is set such that it decreases as the rotational speed of said engine increases.

4. A supercharging pressure control system according to claim 1, wherein said predetermined range has a predetermined lower limit value.

5. A supercharging pressure control system according to claim 4, wherein said control means includes detecting means for detecting operating conditions of said engine, including a sensor for detecting the rotational speed of said engine, said determining means determining whether or not said temperature of said catalytic converter is lower than said predetermined lower limit value and it is detected by said detecting means that said engine is idling.

6. A supercharging pressure control system according to claim 5, wherein said control means includes desired supercharging pressure-setting means for setting a desired supercharging pressure according to said temperature of said catalytic converter when said determining means has determined that said temperature of said catalytic converter is lower than said predetermined lower limit value, said control means controlling said driving means in a manner such that supercharging pressure becomes equal to said desired supercharging pressure.

* * * * *